(12) United States Patent
Galicia et al.

(10) Patent No.: US 8,374,583 B2
(45) Date of Patent: Feb. 12, 2013

(54) MESSAGE FORMAT CONVERSION IN COMMUNICATIONS TERMINALS AND NETWORKS

(75) Inventors: Joshua D. Galicia, Schaumburg, IL (US); Binu Abraham, Waukegan, IL (US)

(73) Assignee: Motorola Mobility LLC, Libertyville, IL (US)

( * ) Notice: Subject to any disclaimer, the term of this patent is extended or adjusted under 35 U.S.C. 154(b) by 464 days.

(21) Appl. No.: 12/615,329

(22) Filed: Nov. 10, 2009

(65) Prior Publication Data

US 2010/0056118 A1 Mar. 4, 2010

Related U.S. Application Data

(62) Division of application No. 10/609,949, filed on Jun. 30, 2003, now Pat. No. 7,630,705.

(51) Int. Cl.
*H04W 4/12* (2009.01)

(52) U.S. Cl. ............... 455/412.1; 455/414.1; 455/412.2

(58) Field of Classification Search ............... 455/412.1, 455/412.2, 414.4, 466, 566, 425.1; 370/316, 370/349; 709/206, 230, 247
See application file for complete search history.

(56) References Cited

U.S. PATENT DOCUMENTS

| 6,985,720 B2 * | 1/2006 | Qu et al. ............... 455/412.1 |
| 2003/0158902 A1 * | 8/2003 | Volach ............... 709/206 |
| 2004/0185883 A1 * | 9/2004 | Rukman ............... 455/466 |
| 2004/0203956 A1 * | 10/2004 | Tsampalis ............... 455/466 |

* cited by examiner

*Primary Examiner* — Melur Ramakrishnaiah

(57) ABSTRACT

A method in a communications terminal, including generating a message in a message format that requires transmission of the message in separate transmissions and packaging the message in a message format other than the message format that requires transmission of the message in separate transmissions if a number of separate transmissions required to transmit the message exceeds a threshold.

6 Claims, 5 Drawing Sheets

MESSAGE FORMAT CONVERSION IN COMMUNICATIONS TERMINALS AND NETWORKS

CROSS REFERENCE TO RELATED APPLICATIONS

The present application is a division of commonly assigned co-pending U.S. application Ser. No. 10/609,949 filed on 30 Jun. 2003, the contents of which are hereby incorporated by reference and from which benefits are claimed under 35 U.S.C. 120.

FIELD OF THE DISCLOSURE

The present disclosure relates generally to message communications, and more particularly to message interoperability for subscriber terminals and interoperability for reducing network loads, for example, in wireless communications networks, messaging servers for converting messages from one format to another, and related methods.

BACKGROUND

The recent growth and evolution of messaging services has resulted in several messaging formats and protocols, including for example, the Short Messaging Service (SMS) and related Enhanced Messaging Service (EMS), and the Multimedia Messaging Service (MMS) protocols. The SMS format permits text only limited length messages based on a specified character set. The EMS format is based on the SMS text format and permits minimal text formatting, low-resolution black and white and color images and simple sounds, for example, the I-Melody format of the Infrared Data Association (IDA). EMS will also enable animation that resides on the communications subscriber terminal. Some SMS-compatible subscriber terminals are able to receive unformatted EMS message text, but will discard images and audio information. Other SMS-compatible terminals will not be able to receive or interpret EMS messages, although some EMS-incompatible terminals maybe upgradeable. SMS and EMS messages are relatively small and intended to be transmitted in available bandwidth, without assigning a dedicated voice channel. MMS supports numerous types of media including text, images and video. MMS uses the Simple Mail Transfer Protocol (SMTP) and the Multi-purpose Internet Mail Extension (MIME) format. MMS also requires the allocation of dedicated network resources in new generation communications networks, for example, 2.5 Generation Global System for Mobile Communications Generalized Packet Radio Service (GSM/GPRS) with Enhanced Data for Global Evolution (EDGE) networks and $3^{rd}$ Generation Partnership Project (3GPP) and 3GPP2 compliant networks.

Messaging protocol incompatibility has been addressed generally. U.S. Patent Publication No. 2003/0040300A1 entitled "Systems of Interoperability Between MMS Messages And SMS/EMS Messages And an Associated Exchange Method", for example, discloses communications networks having a message gateway that interconnects different messaging servers, for example, EMS, SMS, MMS, Post Office Protocol (POP) messaging servers, etc. The message gateway receives all inter and intra-network originated messages and routes the messages to recipient terminals via the corresponding messaging server, e.g., via an EMS, SMS, MMS, POP server, etc. The message gateway includes an essential table of terminal profiles including the messaging format, for example, SMS, EMS, MMS, POP, etc., processing capabilities and corresponding server information for each terminal in the domain of the message gateway. The message gateway uses the terminal profiles to convert incoming messages to the format of the recipient terminal and routes the converted message accordingly.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
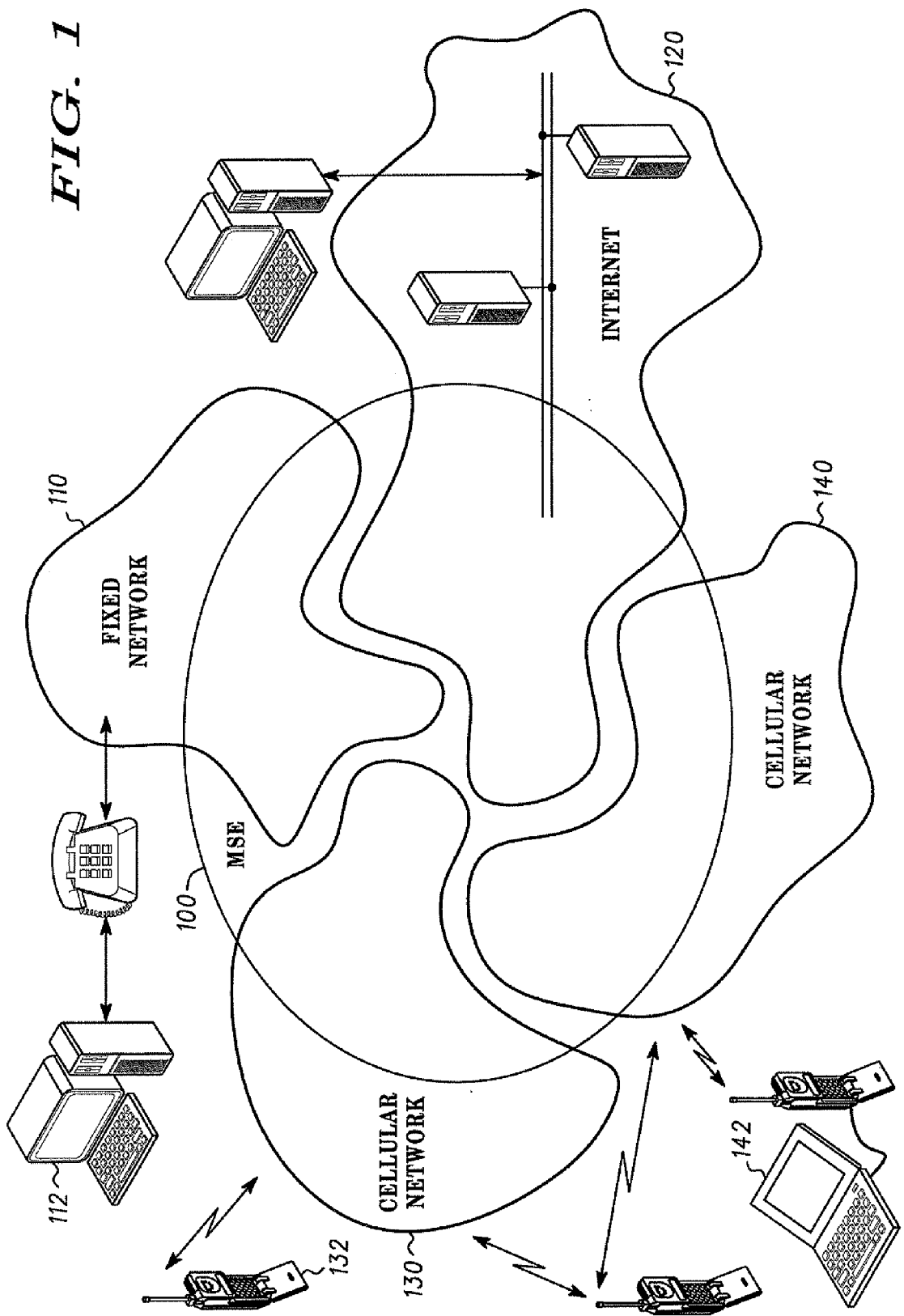
FIG. 1 is an exemplary messaging service environment in several networks.

FIG. 1 illustrates a messaging service environment (MSE) 100 in several different exemplary network types including a fixed network 110, for example, an Intranet or some other network, having fixed location terminals 112, the Internet 120, and cellular communications networks 130 and 140, which include mobile terminals, for example, cellular handsets 132 and wireless enabled personal computers 142, personal digital assistants, etc. The communications networks illustrated are only exemplary of environments where messaging services may be deployed and not intended to limit the scope of the disclosure or the appended claims.

Figure 2:
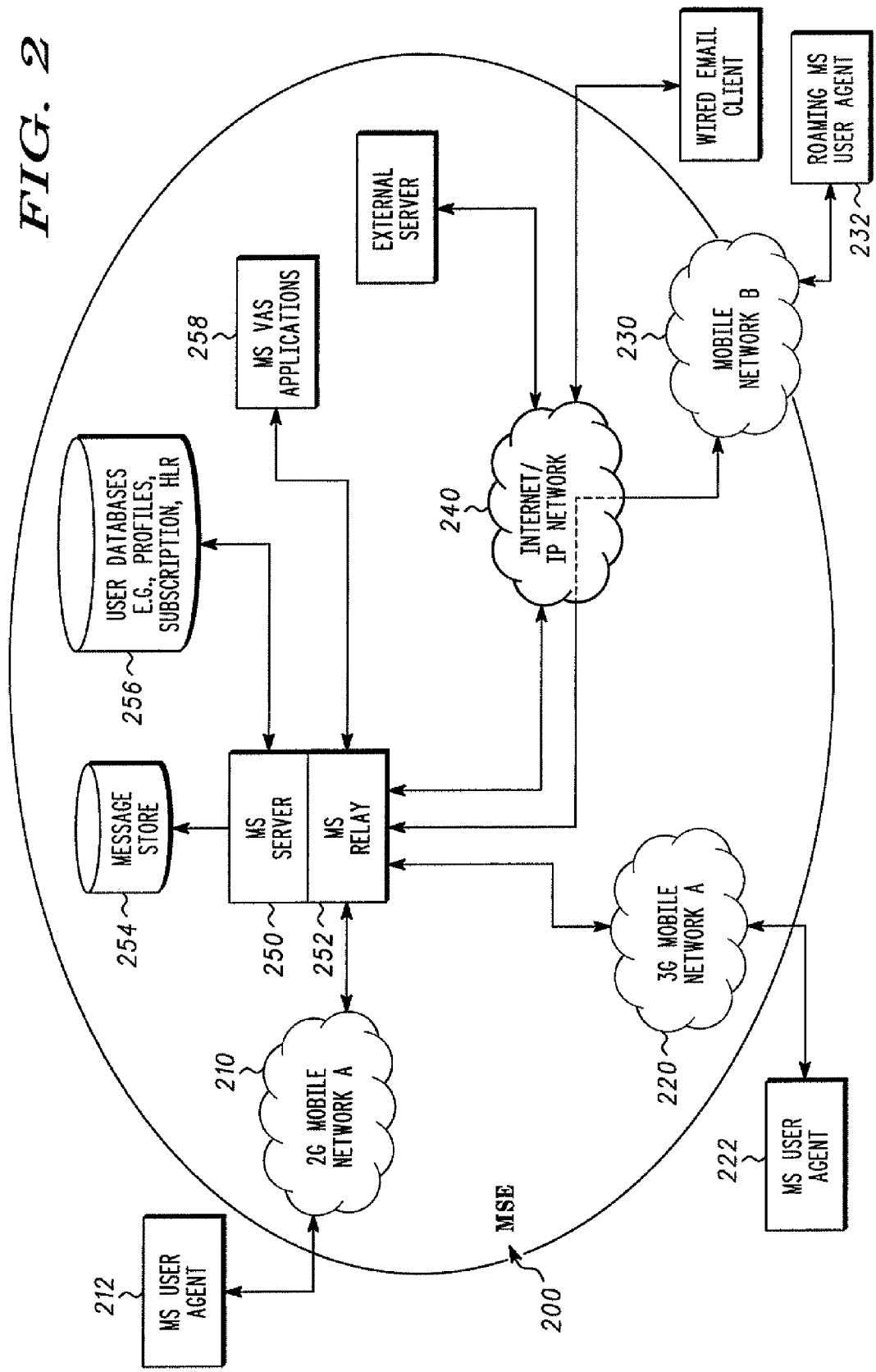
FIG. 2 illustrates architectural elements of an exemplary multimedia messaging service.

In the exemplary architecture of FIG. 2, the messaging service environment (MSE) 200 includes a $2^{nd}$ Generation (2G) Global System for Mobile Communications (GSM) radio access network 210, which may include a General Packet Radio Service (GPRS) and a $3^{rd}$ Generation (3G) Universal Mobile Telephone System (UMTS) network 220, which may also include a GPRS, and another mobile network 230, for example, an IS-95 CDMA cellular communications network or some other mobile devices communications network capable of providing messaging services. The networks 210, 220 and 230 are coupled to a messaging service (MS) server 250, either directly or by another network, for example, the Internet 240.

The exemplary MS server 250 includes a MS relay 252 coupled to a message store 254 and to a messaging user database 256, which includes, for example, subscriber terminal profiles, subscription and Home Location Register (HLR) information. The exemplary MS relay 252 is also coupled to messaging service (MS) voice activated software (VAS) applications. The messaging server architecture of FIG. 2 is only exemplary and not intended to limit the disclosure, which is applicable to different messaging architectures including for example, architectures supporting the Short Messaging Service (SMS) protocol, Enhanced Messaging Service (EMS) protocol, Multimedia Messaging Service (MMS) protocol, Post Office Protocol (POP), among other messaging architectures.

Some mobile wireless communications protocols, for example, CDMA IS-637-A/B, do not support multiple recipient addressing schemes for Mobile Originated (MO) Short Messaging Service (SMS) messages. IS-637-A is a short messaging service for spread spectrum systems. IS-637-B is a short messaging service for wideband spread spectrum systems. In CDMA IS-637-A/B protocol messaging systems, when a message is sent to multiple destinations, the handset must send a separate over-the-air (OTA) data burst message for each destination or recipient, since multiple destinations are not permitted in a single message. This requires more time and system resources to send a single "user level" message.

The addition of 3$^{rd}$ Generation Partnership Project (3GPP) Enhanced Messaging Service (EMS) to IS-637-B requires that messages be segmented, wherein each message segment is transmitted separately, for example, in multiple OTA data bursts, depending upon message size. Thus, generally, the number of OTA data bursts required to transmit 3GPP EMS messages in IS-637-B systems is dependant on the number of message destinations and the number of segments per EMS message.

Assume, for example, that a mobile subscriber composes a message containing some text and multimedia content supported by the 3GPP EMS standard. An exemplary message of this type may include several Musical Instrument Digital Interface (MIDI) sounds and/or Infrared Data Association (IrDA) format (iMelody) sounds, or some other content. In this example, the 3GPP EMS message is addressed to 10 separate destinations or recipients. The message is formatted as a 3GPP EMS message at the mobile subscriber device, which determines that ten (10) IS-637-B message segments are required to transmit all the text and multimedia content of the message. To transmit a 3GPP EMS message, the mobile subscriber device must establish a CDMA dedicated traffic channel connection, and transmit each OTA data burst message sequentially. Each subsequent burst may not be transmitted until receipt of a network acknowledgement that the burst sent previously was received. Each acknowledgement may require between approximately 1.5 to 6 seconds. At the network, a Short Messaging Service Center (SMSC) sends each message segment to the appropriate destination or recipient. At a round trip time of approximately 2 seconds per OTA data burst and network acknowledgement, the dedicated traffic channel connection must be maintained by the message originating mobile subscriber device for 200 seconds to transmit the 10 segment message to 10 different recipients. During this time, incoming and outgoing calls to the subscriber device originating the messages are not allowed, and the dedicated traffic channel may not be allocated to another subscriber terminal. This allocation of network resources is not very efficient and may be undesirable to network operators. Also, the terminal user is not likely aware that their phone could be in a call for hundreds of seconds while sending an EMS message to multiple destinations.

Figure 3:
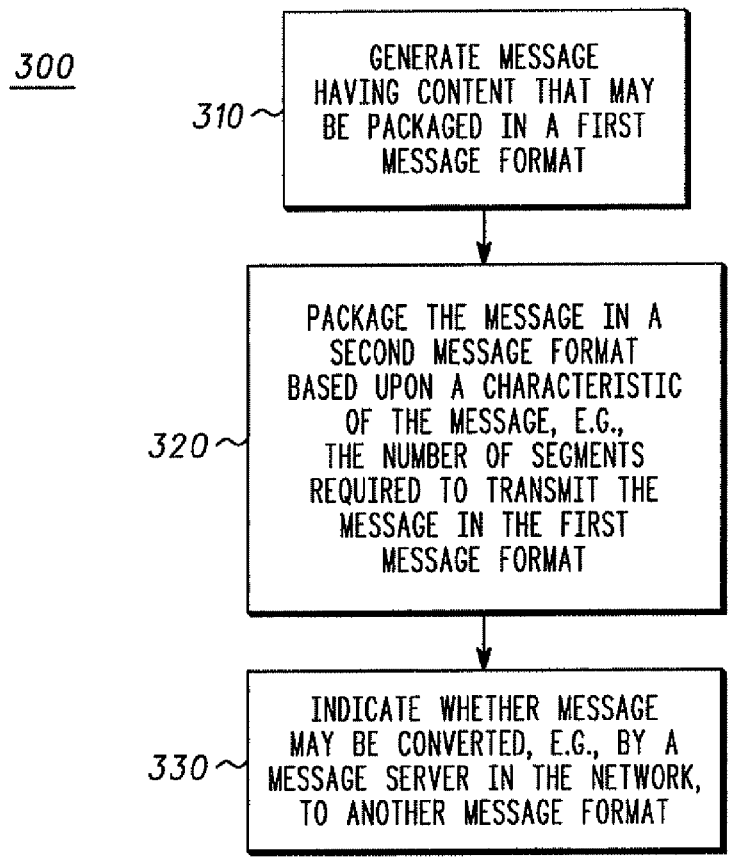
FIG. 3 is an exemplary process in a messaging terminal.

According to one aspect of the disclosure, in the process diagram of FIG. 3, at block 310, a communications terminal generates a message having content that may be packaged in a first message format, for example, the first format may be one of a Short Messaging Service (SMS) protocol or an Enhanced Messaging Service (EMS) protocol, or some other message format. At block 320, the message generated is packaged in a second message format based upon one or more characteristics of the message. In one embodiment, the second message format is a later generation message format than the first message format. For example, where the first format is one of a Short Messaging Service (SMS) protocol or an Enhanced Messaging Service (EMS) protocol, the second format is a Multi-Media Messaging Service (MMS) protocol or some other later generation message format. In other embodiments, however, the second message format is an earlier generation message format than the first message format.

In one embodiment, the characteristic of the message is a number of separate transmissions required to transmit the message in the first message format. According to this embodiment, in FIG. 3, at block 310, the message generated is in a message format that requires transmission of the message in separate transmissions. For example, in some message formats, for example, the Enhanced Message Service (EMS) protocol, the message is transmitted in multiple segments bursts, wherein each burst must be acknowledged before the next burst is transmitted as discussed above. In this exemplary embodiment, the message is packaged in a message format other than the message format that requires transmission of the message in multiple separate transmission bursts, for example, segment bursts that must be acknowledged, if a number of separate transmissions required to transmit the message exceeds a threshold.

In one embodiment, the second message format is one that reduces the transmission time relative to the transmission time of the first message format. For example, the first message format may be either an SMS or EMS protocol message, and the second message format is the MMS protocol message. The transmission from the terminal of a 2 KB MMS protocol message, which is approximately equivalent to a 10 segment EMS protocol message, to 10 recipients requires at most several seconds, including setup time, compared to the 200 seconds required to transmit the equivalent EMS protocol message to 10 recipients, as discussed above.

In another embodiment, the characteristic of the message includes a number of intended recipients of the message. In one embodiment, the first message format is a format of the type that requires separately transmitting the message to each of the multiple recipients, for example, an SMS or EMS protocol message. Message formats of this type include, for example, the SMS or EMS protocols. In this exemplary embodiment, the message is packaged in the second message format based upon the number of recipients of the message. In one embodiment, for example, the second message format permits transmission of the message to multiple recipients in a single transmission. The MMS protocol is an example of a message format that permits encoding multiple recipients in a single message.

In other embodiments, the format in which the message is packaged is based on both the number of separate transmissions required and on the number of recipients of the message, where the first message format is of the type that requires transmission of the message in multiple transmissions and prohibits more than one recipient at a time.

In some embodiments, the terminal originating the message indicates in the message, for example, by setting a flag in a designated field within the message or message package, whether or not the message may be converted to another message format, as illustrated in FIG. 3 at block 330. Conversion of the message to another format may be performed, for example, by a messaging server in the network, for example, based on the messaging capabilities of the recipient terminal or based upon some other criteria as discussed more fully below. In one application, the originating terminal indicates that the message may not be converted to another format for the purpose of preserving messaging functionality that would be lost upon converting from one format to the other format. According to this application, the default procedure at the messaging server is to convert the message to another format unless the flag or other indicium indicates that the message should or must not be converted to another format. For example, where there are multiple recipients in an MMS protocol message, conversion of the message to an SMS or EMS protocol message may result in loss of the ability of the message recipient to reply to all addressees, since the SMS or EMS protocol messages permit only a single addressee. Another example where it may be desirable not to convert the message format is in applications where content would be lost during the format conversion.

In some embodiments, a messaging server located in a communications network, for example a wireless communications network, may convert received messages to another format, for example, based upon the messaging capabilities of the recipient or based upon other criteria, as discussed more fully below. The conversion of messages at the messaging server to different formats is generally independent of whether, or in what form, the originating terminal packaged the message.

Figure 4:
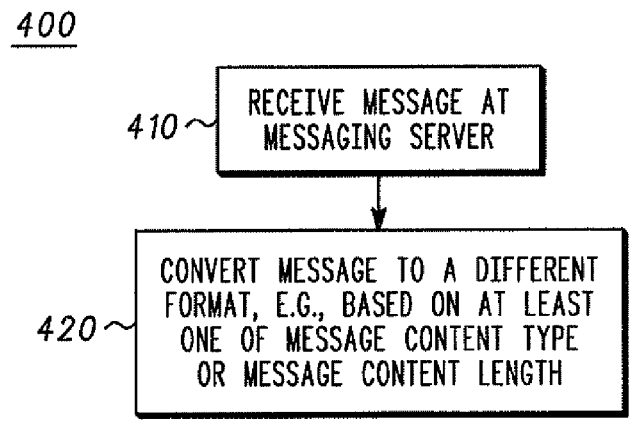
FIG. 4 is an exemplary process in a messaging server.

In the process diagram 400 of FIG. 4, at block 410, an incoming message having at least one recipient is received by or at a messaging server. At block 420, the incoming message is converted to a different message format.

In one embodiment, the incoming message is converted to the different message format by converting the incoming message to a message format of an earlier generation message protocol than the protocol or format of the incoming message. In one application, for example, an incoming MMS protocol message is converted to either an SMS protocol message or to an EMS protocol message. In some applications, the conversion of the message to an earlier generation format eliminates the requirement or necessity of determining the messaging capability of the recipient terminal. Generally, conversion of the message to an earlier generation message format occurs where the conversions would not result in the loss of content, although there may be exceptions, which are discussed further below.

In applications where the incoming message, for example, an MMS protocol message, is encoded with multiple recipients is converted by the messaging server to a format that permits specifying not more than a single recipient, e.g., to an SMS or EMS protocol message, the server separately transmits the message in the format permitting only a single recipient to each of the multiple recipients.

As discussed above, the conversion of the message at the messaging server to an earlier generation message format may result in loss of certain messaging functionality. Thus in some embodiments, it may be desirable to convert only from older generation formats to newer generation messaging formats. The server may use an indication in the message, provided by the message originator, to guide the decision whether to convert the message from one format to another, for example, in the absence of the messaging capability of the recipient.

Thus in some embodiments, the message is converted to a different format without regard for a messaging capability of the intended recipient or recipients of the message. In this exemplary embodiment, the message may be converted to an earlier generation format, without regard for the capabilities of the recipient, to increase the likelihood that the recipient is able to receive and process the message. There may also be applications where it is desirable to convert the message from an older format to a newer format without knowing the messaging capability of the recipient. In other embodiments, the message format conversion by the server may also be based upon the messaging capabilities of the message recipient. For example, the conversion of the message to an earlier format that would result in loss of content may be acceptable where the recipient is incapable of processing the lost or removed content.

In one embodiment, the message server converts the message to a different format based on at least one of the message content type or message content length, for example, the size of the message or the number of segments required to send the message in a particular format, for example, pursuant to the EMS protocol. In one embodiment, the message is converted to the second message format, for example, to an SMS or EMS message, if the content type of the message having the first message format is text only.

Figure 5:
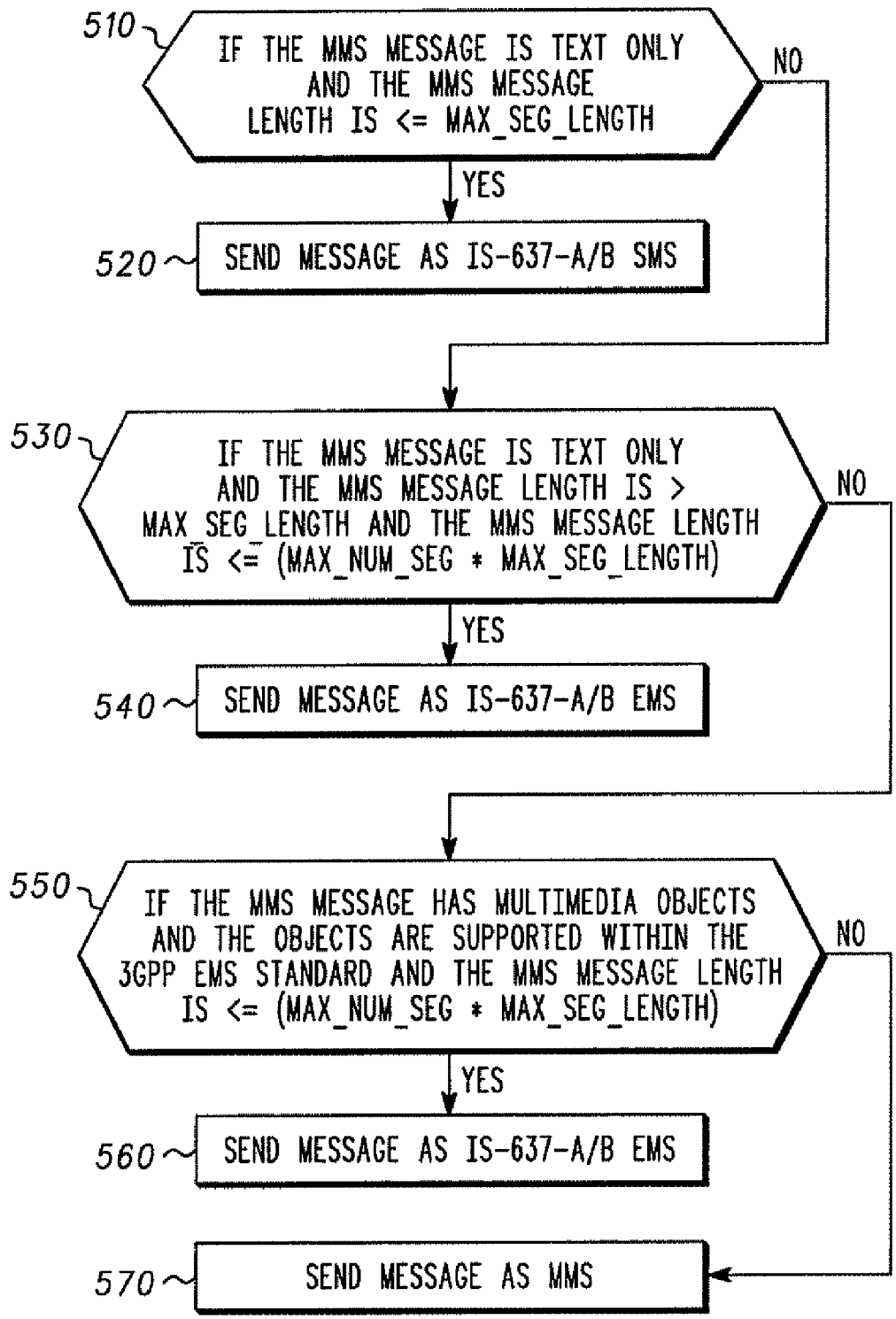
FIG. 5 is another exemplary process in a messaging server.

In the exemplary process diagram 500 of FIG. 5, the message server receives an MMS protocol message. At block 510, the message content length and message content type are determined. If the message content is text only and if the message (text) length is less than or equal to a maximum segment length then the message is converted and sent to its recipient as an SMS message, for example, as an IS-637-A/B SMS message at block 520. Otherwise the exemplary process proceeds to block 530.

In another embodiment, the message having the first message format is converted to a message having a third message format, for example, to an EMS message, if the content length of the message having the first message format is greater than the first specified length.

In FIG. 5, at block 530, if the MMS message is a text only message and the message length is greater than the maximum segment length and less than a maximum number of segments multiplied by the maximum segment length, then the message is converted and sent as an EMS message, for example, as an IS-637-A/B EMS message at block 540. Otherwise the exemplary process proceeds to block 550.

In some situations it is unnecessary to convert the message format. In FIG. 5, at block 550, if the MMS message has multimedia objects and the objects are supported within the 3GPP EMS standard and if the message length is less than or equal to the maximum number of segments multiplied by the maximum segment length, then the message is converted and sent as an EMS message, for example, as an IS-637-A/B EMS message at block 560. Otherwise the exemplary process proceeds to block 560 and forwards the MMS message to its recipient without converting the message.

Figure 6:
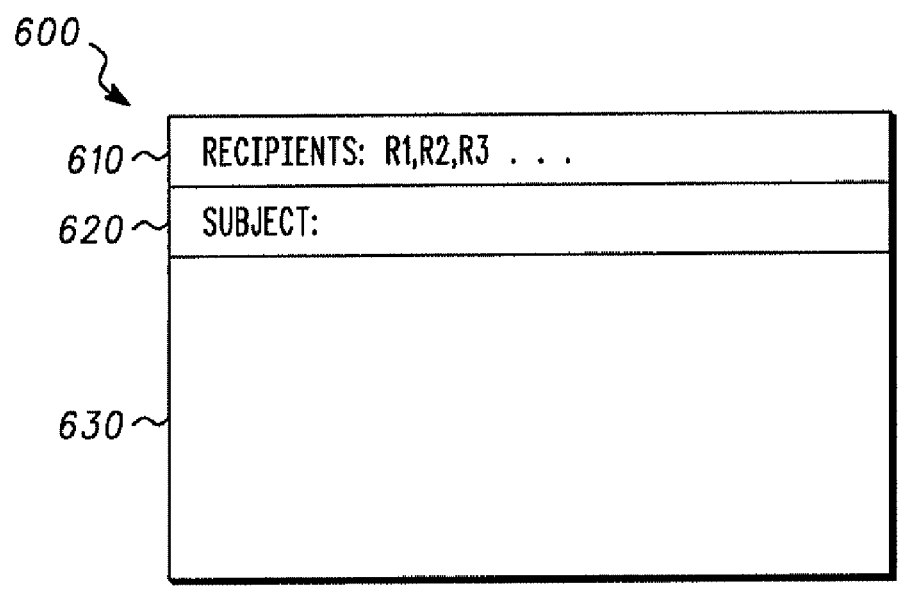
FIG. 6 is an illustration of a first format message having multiple recipients.

In some embodiments, the recipient terminal converts a received message from one format to its original format, and re-establishes functionality lost in when the message was converted from its original format to the format in which the message was received. In FIG. 6, for example, a message 600 is in a format that permits multiple recipients, for example, an MMS protocol message. The exemplary message 600 includes a "recipient" field 610 having multiple recipients R1, R2, R3, etc. The message also includes a "subject" for inclusion of subject information, and a message "body" field 630 for inclusion of content, for example, text. The message 600 may also include other fields not illustrated, for example a field for attached content files, etc.

Figure 7:
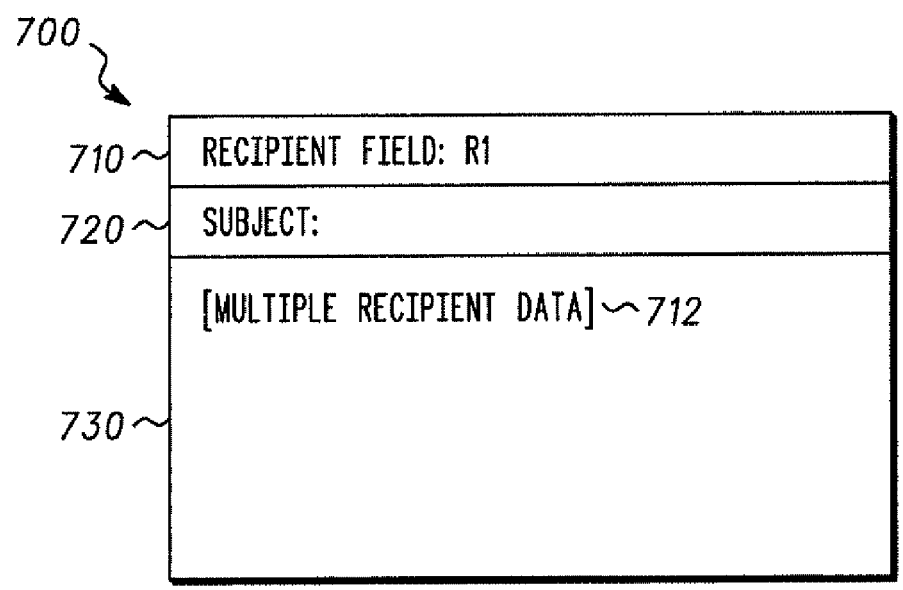
FIG. 7 is an illustration of a second format message having only a single recipient wherein multiple recipient information is preserved elsewhere in the message.

In one embodiment, the message 600 is converted to another message format, for example, at a messaging server, as discussed above. In the exemplary embodiment, the original message is converted to a message format that permits only a single recipient, for example, an SMS or EMS protocol message. FIG. 7 illustrates an exemplary message with a single recipient R1 in the recipient field 710. According to one aspect of the disclosure, when the message is converted from the format of FIG. 6 to the format of FIG. 7, the data in the multiple recipient data in the recipient field 610 of the message 600 is preserved elsewhere in the message, for example, in the body of the message 700, or in some other designated field, for example, an unassigned field.

The preserved recipient data 712 is preferably identified, for example, located between specified indicia so that if or when the message 700 is re-converted to its original format, illustrated in FIG. 6, the recipient data 712 may be re-introduced into the multiple recipient field of the original message, thus enabling the recipient to send a reply to all recipients of the original message. The message recipient is thus able to restore message functionality lost when the original message was converted to the format that destroyed the functionality.

While the present disclosure and what are considered presently to be the best modes thereof been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a communications terminal, the method comprising:
   generating, by the communications terminal, a message in a message format that requires transmission of the message in separate transmissions;
   packaging, by the communications terminal, the message in a message format other than the message format that requires transmission of the message in separate transmissions if a number of separate transmissions required to transmit the message exceeds a threshold.

2. The method of claim 1,
   the message format that requires multiple transmissions requires that the message be transmitted in multiple segments,
   packaging the message in a message format other than the message format that requires transmission of the message in multiple segments if a number of segments required to transmit the message exceeds a segment threshold.

3. The method of claim 1,
   the message format that requires multiple transmissions is an Enhanced Messaging Service (EMS) format,
   packaging the message as an Multi-Media Messaging Service (MMS) format if a number of message segments required to transmit the message in the EMS format exceeds a segment threshold.

4. The method of claim 1,
   addressing the message to multiple recipients,
   the message format that requires multiple transmissions requires that the message be separately transmitted to each recipient,
   packaging the message in a message format that permits transmission of the message to the multiple recipients in a single transmission if a number of recipients exceeds a recipient threshold.

5. The method of claim 4, transmitting the message to the multiple recipients in a single transmission after packaging the message in the message format that permits transmission of the message to the multiple recipients in a single transmission.

6. The method of claim 1, indicating in the message generated whether the message may be converted to another message format.

* * * * *